United States Patent
Gao et al.

(10) Patent No.: US 12,123,786 B2
(45) Date of Patent: Oct. 22, 2024

(54) CRYOGENIC THERMOMETER BASED ON A TWO-LEVEL SYSTEMS (TLS)

(71) Applicant: The Regents of the University of Colorado, Denver, CO (US)

(72) Inventors: Jiansong Gao, Boulder, CO (US); Maxime Bernard Jacques Malnou, Boulder, CO (US); Michael Robert Vissers, Broomfield, CO (US); Jordan Wheeler, Arvada, CO (US)

(73) Assignees: The Regents of the University of Colorado, a body corporate, Denver, CO (US); National Institute of Standards and Technology, Gaithersburg, MD (US)

(*) Notice: Subject to any disclaimer, the term of this patent is extended or adjusted under 35 U.S.C. 154(b) by 531 days.

(21) Appl. No.: 17/476,832

(22) Filed: Sep. 16, 2021

(65) Prior Publication Data
US 2022/0082449 A1    Mar. 17, 2022

Related U.S. Application Data

(60) Provisional application No. 63/079,099, filed on Sep. 16, 2020.

(51) Int. Cl.
*G01K 7/00*    (2006.01)
*G01K 1/14*    (2021.01)

(52) U.S. Cl.
CPC .............. *G01K 7/006* (2013.01); *G01K 1/14* (2013.01)

(58) Field of Classification Search
CPC .................................. G01K 7/006; G01K 1/14
See application file for complete search history.

(56) References Cited

U.S. PATENT DOCUMENTS

| 7,104,684 | B2 | 9/2006 | Felder |
| 7,532,056 | B2 | 5/2009 | Seo |
| 10,436,650 | B2 | 10/2019 | Maurer et al. |
| 10,505,245 | B2 | 12/2019 | Olivadese et al. |
| 10,740,688 | B2 | 8/2020 | Selvanayagam et al. |
| 2021/0003456 | A1* | 1/2021 | Olivadese ............... G06F 30/20 |
| 2021/0003457 | A1* | 1/2021 | Olivadese ................ H01P 7/10 |

FOREIGN PATENT DOCUMENTS

CN    113366513 A  *  9/2021  ............. G06N 10/00

* cited by examiner

*Primary Examiner* — Mirellys Jagan

(57) ABSTRACT

Technology is disclosed herein that the enhances the measurability of on-chip temperature in a cryogenic quantum computing environment. In an implementation, transceiver circuitry sends a probe signal through a target device. A lumped-element resonator device that is proximate to the surface of the target device interacts with the probe signal and modulates the probe signal. Processing circuitry reads the probe signal through the target device, and responsively measures the resonance frequency of the lumped-element resonator device. The processing circuitry correlates the measured resonance frequency with a temperature and responsively determines the temperature of the target device.

20 Claims, 11 Drawing Sheets

CRYOGENIC THERMOMETER BASED ON A TWO-LEVEL SYSTEMS (TLS)

RELATED APPLICATIONS

This application is related to, and claims the benefit of priority to, U.S. Provisional Patent Application 63/079,099 filed on Sep. 16, 2020, and entitled CRYOGENIC THERMOMETER BASED ON TWO-LEVEL SYSTEMS.

STATEMENT REGARDING FEDERALLY FUNDED RESEARCH

This invention was made with government support under grant number 70NANB18H006 awarded by NIST. The government has certain rights in the invention.

TECHNICAL FIELD

Aspects of the disclosure are related to the field of quantum computing devices and in particular, to a Two-Level System (TLS) device that determines the temperature of quantum computing devices.

BACKGROUND

Microwave based processing devices are used for quantum computing. One feature of microwave-based processing devices is the need to operate at cryogenic temperatures often below 1° Kelvin. Resistance based thermometers may be used to measure the temperature of microwave-based processing devices. A resistive thermometer is readout by a 4-wire measurement. Two wires provide current bias, and the other two wires measure the voltage. These dedicated wires must be routed to the room temperature electronics away from the cryogenic environment where the microwave device is located. The dedicated wires add complexity to the platform and may cause electromagnetic interference. The wires may introduce excess thermal load and heat up the microwave device which may cause inaccurate temperature readings. Unfortunately, resistive thermometers require excessive wiring and do not easily attach to a cryogenic microwave device. Therefore, resistive thermometers are difficult to integrate with microwave devices and do not effectively measure on-chip temperature of a cryogenic microwave device.

OVERVIEW

Technology is disclosed herein that enables the measurement of on-chip temperature of cryogenic microwave devices. In an implementation, transceiver circuitry sends a probe signal through a target device. A lumped-element resonator device is positioned proximate to the surface of the target device. The resonance frequency of the lumped-element resonator device is sensitive to the temperature. The lumped-element resonance device interacts with the probe signal and modulates the phase and amplitude of the probe signal. The processing circuitry reads the probe signal through the target device and responsively measures the resonance frequency of the lumped-element resonator device. The processing circuitry correlates the measured resonance frequency with a temperature and responsively determines the temperature of the target device.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
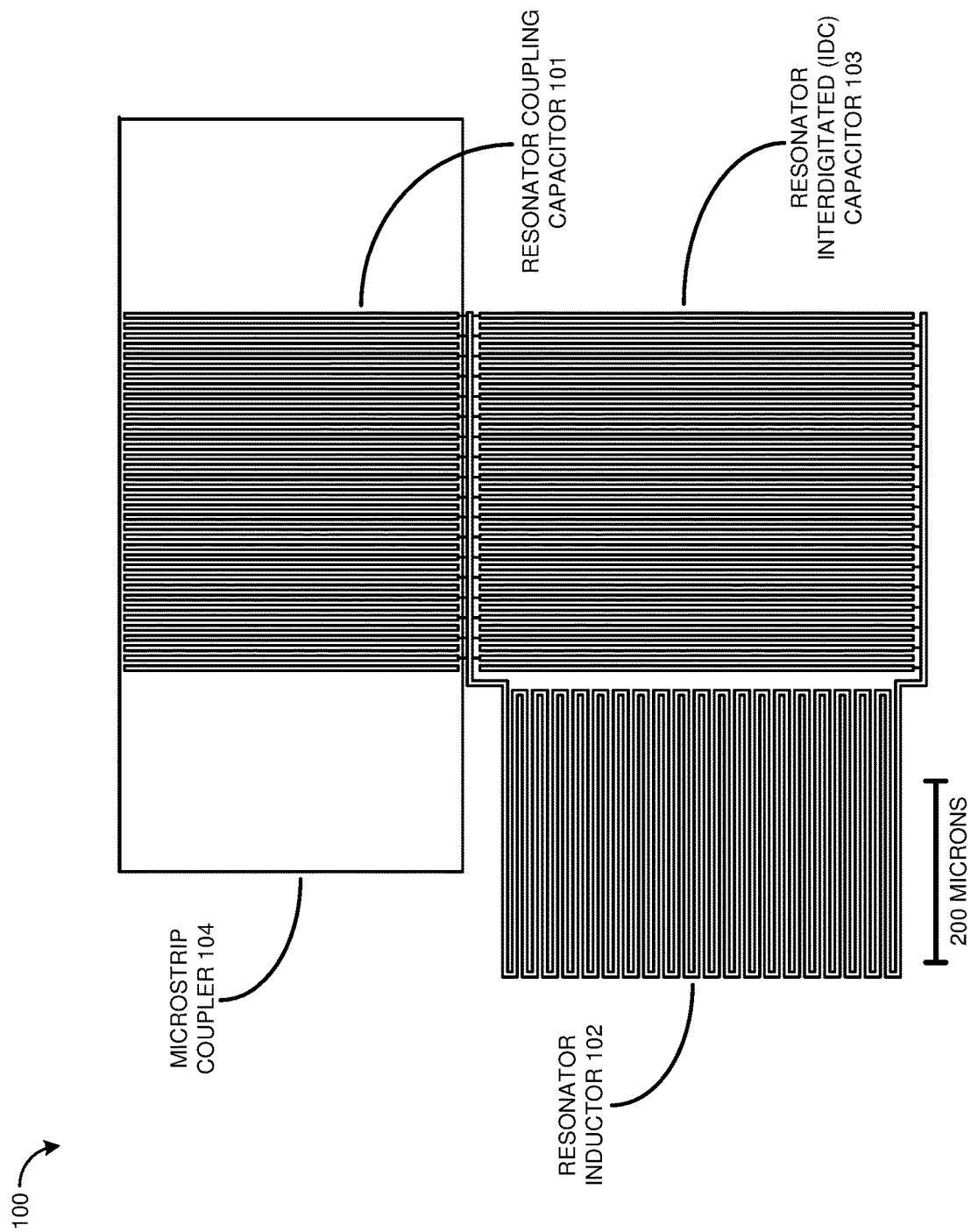
FIG. 1 illustrates an exemplary Two-Level System (TLS) thermometer configured to determine the temperature of a target device.

Various solutions to the challenges discussed above are disclosed herein, including an apparatus comprising a Two-Level System (TLS) cryogenic thermometer that measures temperatures below 1 Kelvin. The TLS thermometer comprises a superconducting micro-resonator with amorphous dielectric materials. The dielectric materials comprise TLSs grown, deposited or naturally formed on the surfaces. A TLS is a two-state quantum system that can exist in any quantum superposition of two independent quantum states found in amorphous dielectric materials. The temperature is read out by measuring the resonance frequency of the TLS-loaded superconducting micro-resonator, which depends on temperature. The dependence follows an analytical curve. The TLS thermometer can be frequency multiplexed into the microwave devices and their existing readout systems without additional dedicated wiring.

Microwave based supercomputing quantum computing systems often require cryogenic temperatures in the range of 1K and below to function properly. The temperature of quantum computing systems must be known to determine if the system is overheating. Many quantum computing systems rely on resistance-based thermometers to monitor temperature. Conventional thermometers used at sub-Kelvin temperatures are resistive thermometers (such of Ruthenium oxide or a Cernox) whose resistance (R) sensitively depends on the temperature (T). Resistance based thermometers correlate measured resistance to temperature. The sensor's R(T) is engineered to exhibit a steep slope in the designed temperature range. This resistance R is readout and then converted to a temperature reading either using a calibrated lookup table or fitted functional form. Most resistance-based thermometers utilize a four Direct Current (DC) wire arrangement. Two of the wires provide current bias and two wires measure the voltage. The wires are routed outside of the cryogenic environment where the quantum computing system is located to room temperature electronics. The DC-wires create complexity and cause electromagnetic interference in the quantum computing system. During operation, the DC-wires introduce excess thermal load thereby heating up the quantum computing system. The excess thermal load may alter the temperature of the quantum computing system resulting in inaccurate temperature readings of the quantum computing system.

Other technical issues arise with the use of resistance-based thermometers. The response time exhibited by resistance-based thermometers typically falls in the range of 0.1 seconds. This response time inhibits effective measurement of transient thermal phenomenon. The response time further inhibits real-time or near real-time temperature monitoring of dynamic processes.

Quantum systems often include quantum-based chips. Some of these quantum-based chips operate using microwaves. An example of this type of chip is a Kinetic Inductance Traveling-Wave Parametric Amplifier (KIT) chip. It is often desirable to measure the "on-chip" temperature of a KIT chip. The wiring of resistance-based thermometers is cumbersome and creates difficulties when attaching the thermometer to the surface of the KIT chip. When operating, resistance-based thermometers create electromagnetic interference that can affect the operation of the KIT chip. The DC-wires of resistance-based thermometers further introduce heat to the system thereby heating up the KIT chip which inhibits accurate temperature readings. These technical limitations effectively inhibit accurate and effective on chip temperature measurements of quantum-based chips using resistance-based thermometers.

Instead, a replacement for resistance-based thermometers for use in cryogenic quantum computing systems is proposed herein to overcome the aforementioned problems. The replacement comprises a frequency-readout based thermometer to correlate measured resonance frequency with temperature.

FIG. 1 illustrates TLS thermometer 100. TLS thermometer 100 comprises a superconducting lumped-element resonator device that contains TLSs. TLS thermometer 100 comprises coupling capacitor 101, meandering inductor 102, Interdigitated Capacitor (IDC) 103, and microstrip coupler 104. When attached to a target device like a microwave based cryogenic chip, a change in the temperature of the target device chip cause a shift in the resonance frequency of the TLS loaded resonator. The resonator (coupling capacitor 101, meandering inductor 102, and IDC 103) interacts with the microwave probe signal passing through the device and modulates the signal. This resonance frequency shift can be measured from the modulated probe tone and correlated to a temperature. Coupling capacitor 101, inductor 102, and IDC 103 comprise a Si substrate with a superconducting material deposited on the surface of the substrate. The amorphous dielectric material containing TLSs may be formed on the surface naturally, deposited, and/or by some other surface depositing method. In some examples, the deposited dielectric material comprises Silicon Oxide ($SiO_2$) and the superconducting material comprises Niobium (Nb) deposited on the surface by lithography. In some examples, the deposited dielectric material comprises Silicon Nitride ($Si_3N_4$) and the superconducting material Niobium (Nb) deposited on the surface. Other examples could include any superconducting metal and any amorphous dielectric. An adhesive is used to bind TLS thermometer 100 configured with microstrip coupler 104 to the surface of a target device. For example, TLS thermometer 100 may bind to the surface of a KIT chip.

The dielectric substrate is typically around 380 microns thick while the superconducting material is typically around 200 nanometers thick—however other dimensions may be used. TLS thermometer 100 is around 1 millimeter by 1 millimeter in area, however the surface area of TLS thermometer 100 may differ in other examples.

Superconducting micro-resonators like TLS thermometer 100 are microwave resonators made by lithographically patterning a superconducting thin film on a substrate. When operating at a temperature far below the superconducting transition, Tc, superconducting micro-resonators show very high-quality factor or Q ($10^4$-$10^7$) due to the extremely low loss of the superconductor. Superconducting micro-resonators have important applications in ultra-sensitive detection and quantum computing. Two-Level Systems (TLS) universally exist in the superconductor surface oxide layer and in the superconductor/substrate interface. These systems interact with the resonator causing signal loss and frequency shift. Although the physical picture of TLS is still not entirely clear, it is thought that in a layer of solid with impurities and defects, an atom or a group of atoms can tunnel between two sites, giving rise to a broad spectrum of two-level tunneling states. Regardless, the standard TLS model was established in 1970s and has successfully explained this phenomenon. In particular, from this model an analytical expression of TLS-induced resonator frequency shift can be derived as:

$$\frac{f_r(T)-f_0}{f_0} = \frac{F\delta}{\pi}\left[Re\left(\psi\left(\frac{1}{2}+\frac{1}{2\pi i}\frac{hf_0}{kT}\right)\right)-\log\frac{hf_0}{2\pi kT}\right] \quad (1)$$

where $\Psi$ is a special math function called the digamma function, $\delta$ is the TLS loss tangent, F is the TLS filling factor, and $f_0$ is the TLS-free true resonance frequency of the resonator.

TLS thermometer 100 comprises a miniature footprint and does not require DC wire connections. TLS thermometer 100 may be attached to a variety of cryogenic chips such as parametric amplifiers, kinetic inductance detectors, microwave SQUID multiplexers and qubits. TLS thermometer 100 can be frequency multiplexed with the devices that it is attached to by borrowing the existing feedline of the target device and easily readout with the existing infrastructure for these applications. Advantageously, TLS thermometer 100 may effectively and efficiently perform on-chip temperature measurements. Moreover, the response time of TLS-thermometer 100 is around ~5 ms which is significantly faster than a conventional resistive thermometer allowing for on-chip temperature measurement of transient phenomenon or real-time temperature monitoring of dynamic processes. Furthermore, TLS thermometer 100 may be multiplexed with an array of other temperature sensors (like TLS thermometer 100) without added complexity. This array could map out the temperature of an entire chip or wafer, thereby improving the understanding of any temperature gradients and the performance of any mitigation measures. TLS-thermometer 100 may be fabricated in a single process step. In some examples, as many as 1200 chips fit within a single three-inch wafer which allows for efficient mass production.

TLS thermometer 100 and cryogenic chips like qubit chips can be fabricated in similar steps and from the same materials such as Nb and high purity Si. In some examples, TLS thermometer 100 and cryogenic chips can be co-fabricated and TLS thermometer 100 may be directly integrated into a cryogenic qubit chip or cryogenic detector chip.

Figure 2:
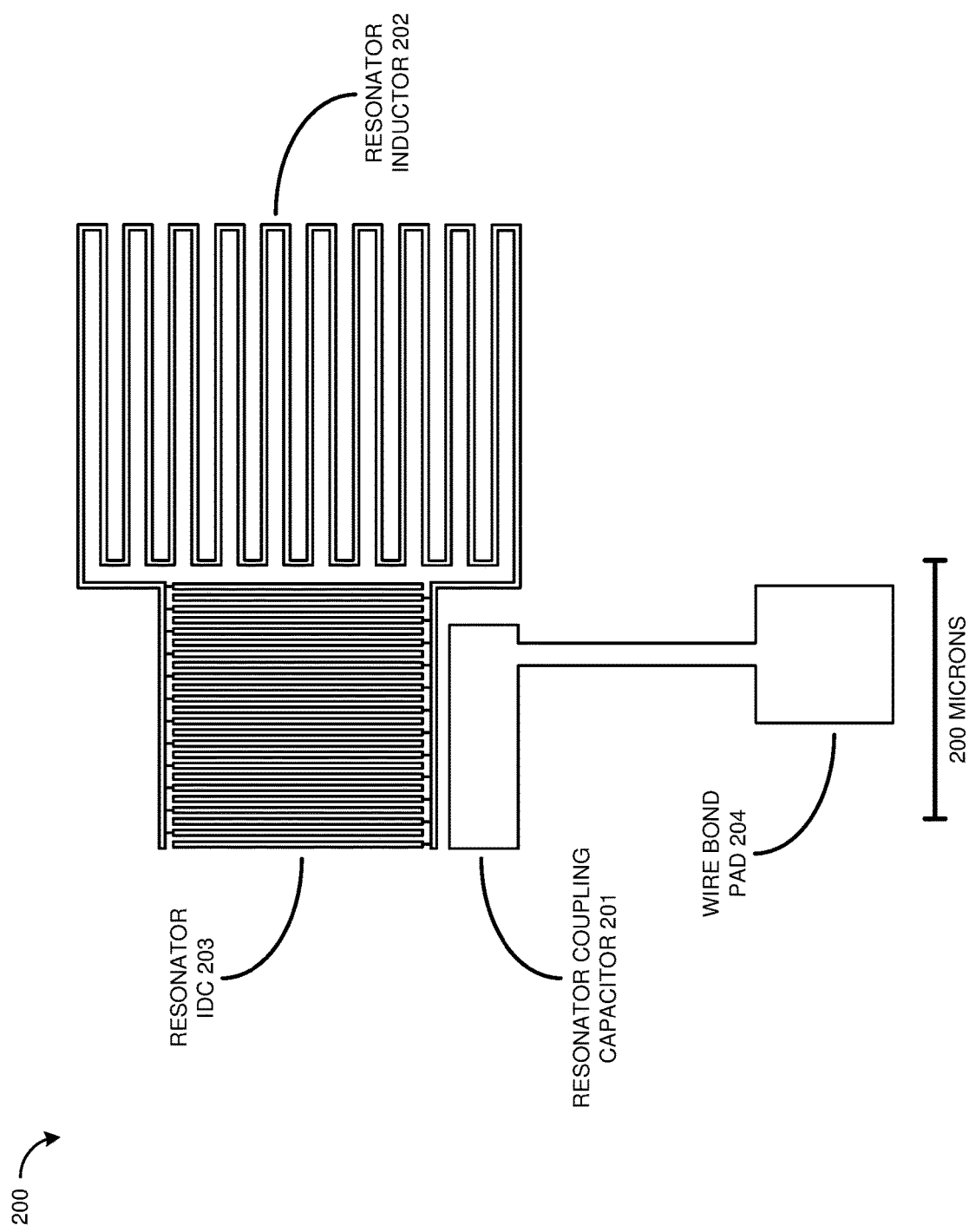
FIG. 2 illustrates an exemplary TLS thermometer configured to determine the temperature of a target device.

FIG. 2 illustrates TLS thermometer 200. TLS thermometer 200 comprises a superconducting lumped-element resonator device that contains TLSs. TLS thermometer 200 comprises coupling capacitor 201, meandering inductor 202, Interdigitated Capacitor (IDC) 203, and wire bond pad 204. Like TLS thermometer 100, coupling capacitor 201, inductor 202, and IDC 203 comprise a substrate with a superconducting material deposited on the surface. The amorphous dielectric material containing TLSs may be formed on the surface naturally, deposited, and/or by some other surface depositing method. In some examples, the deposited dielectric material comprises $SiO_2$, and the superconducting material comprises Nb deposited on the surface. In some examples, the amorphous dielectric material comprises $Si_3N_4$, and the superconducting material Niobium (Nb) deposited on the surface and lithographically etched. An adhesive is used to bind the TLS thermometer 200 to the surface of a target device. Wire bond pad 204 may be bonded to a feedline at the end-launch of a cryogenic chip. Typically, this applies when the feedline of target device is a Coplanar Waveguide (CPW) or a narrow microstrip which does not have extended fringing field for sufficient direct capacitive coupling. In some examples, both TLS thermometer 100 and TLS thermometer 200 are fabricated from 200 nm thick Niobium film on deposited on a 380-micron thick Silicon substrate by standard lithography and diced into a 1.15 mm by 2.5 mm chip.

Figure 3:
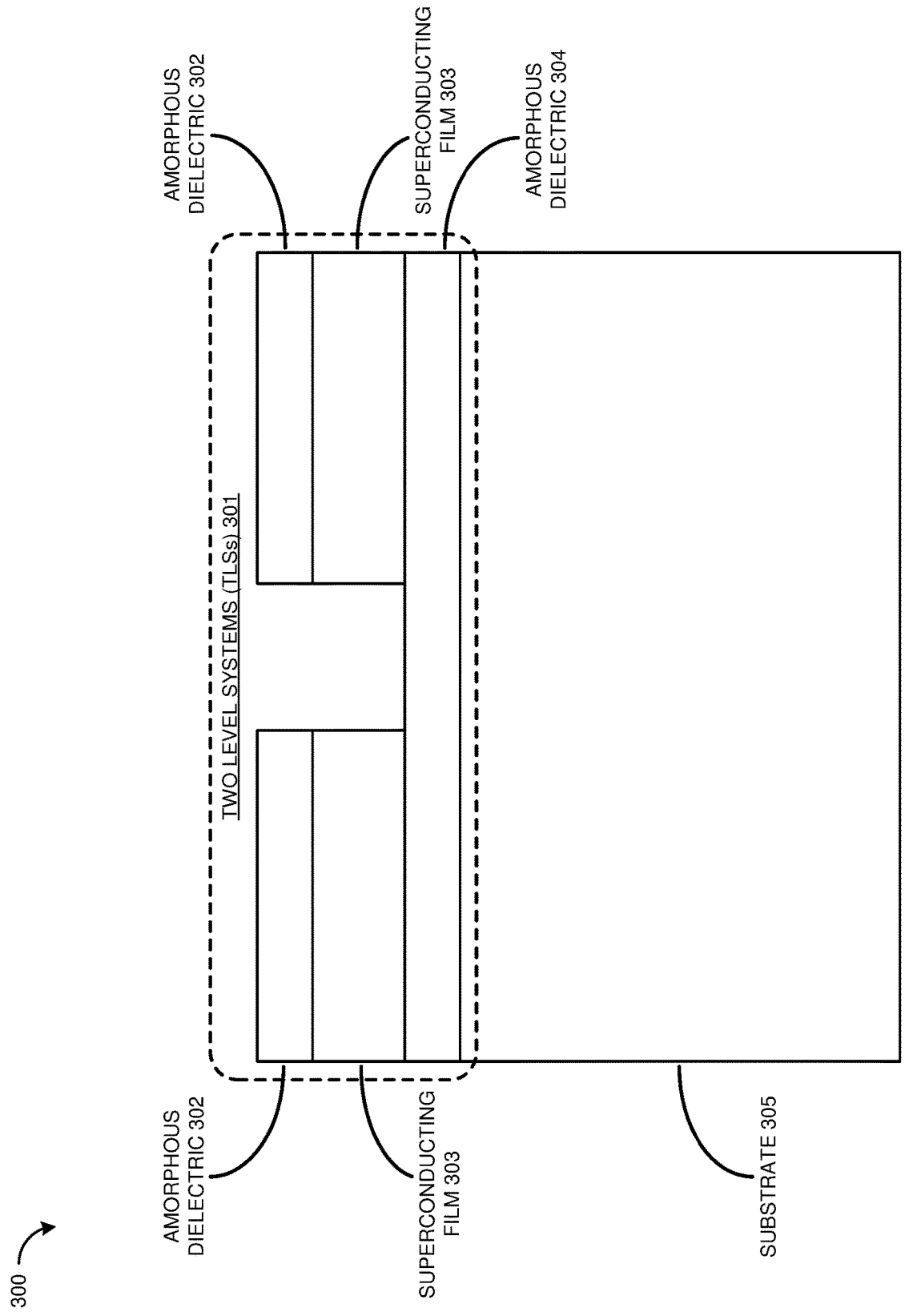
FIG. 3 illustrates an exemplary TLS thermometer configured to determine the temperature of a target device.

FIG. 3 illustrates TLS thermometer 300 configured to measure the temperature of a target device. FIG. 3 comprises a component view of TLS thermometer 300. TLS thermometer 300 comprises TLSs 301, amorphous dielectric 302, superconducting film 303, amorphous dielectric 304, and substrate 305. Amorphous dielectric 301 comprises $SiO_2$ and/or $Si_3N_4$ deposited and/or naturally formed on the surface of superconducting film 303. Superconducting film 303 comprises a superconducting material like Nb deposited on the surface of 305 substrate. Amorphous dielectric 304 comprises $SiO_2$ and/or $Si_3N_4$ deposited and/or naturally formed on the surface of substrate 305. Substrate 305 comprises a silicon wafer or some other type of suitable material. In some examples, amorphous dielectrics 302 and 304 comprise a material(s) that is different than $SiO_2$ and/or $Si_3N_4$. In some examples, superconducting film 303 comprises a material that is different than Nb. TLS thermometer 100 and TLS thermometer 200 may comprise a similar structure to that of TLS thermometer 300.

Figure 4:
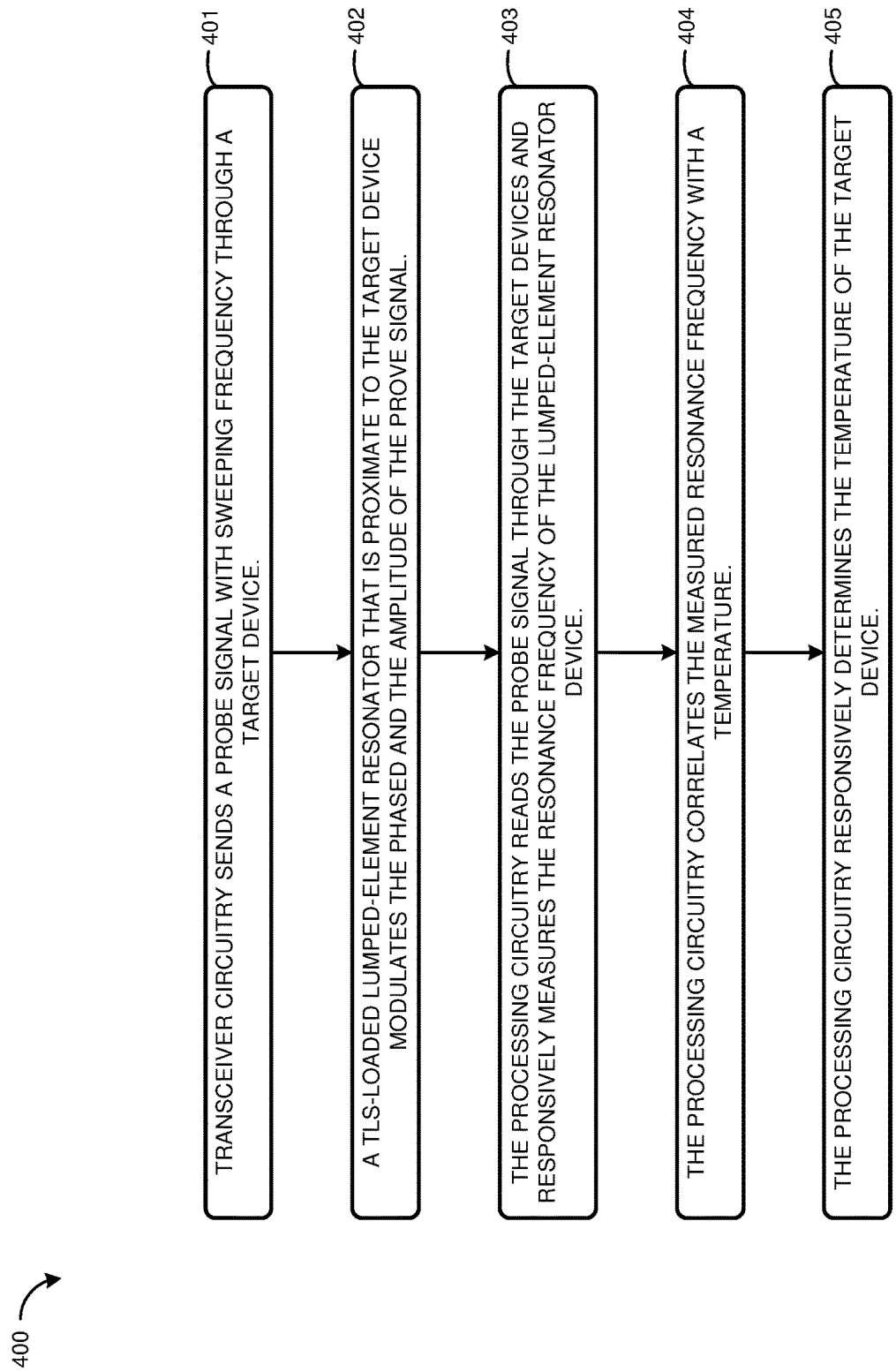
FIG. 4 illustrates an exemplary operation of a TLS thermometer to determine the temperature of a target device.

FIG. 4 illustrates process 400 which comprises an exemplary operation of a TLS thermometer device as contemplated herein (e.g., TLS thermometer 100) to measure the temperature of a target device in a cryogenic environment. The operation may differ in other examples. Transceiver circuitry sends a probe signal with sweeping frequency through a target device (401). A TLS-loaded lumped-element resonator that is proximate to the target device modulates the phase and amplitude of the probe signal (402). The resonance frequency of the resonator is sensitively dependent on the temperature of the target device chip. The processing circuitry reads the probe signal through the target device and responsively measures the resonance frequency of the lumped-element resonator device (403). The processing circuitry correlates the measured resonance frequency with a temperature (404). The processing circuitry responsively determines the temperature of the target device (405).

Figure 5:
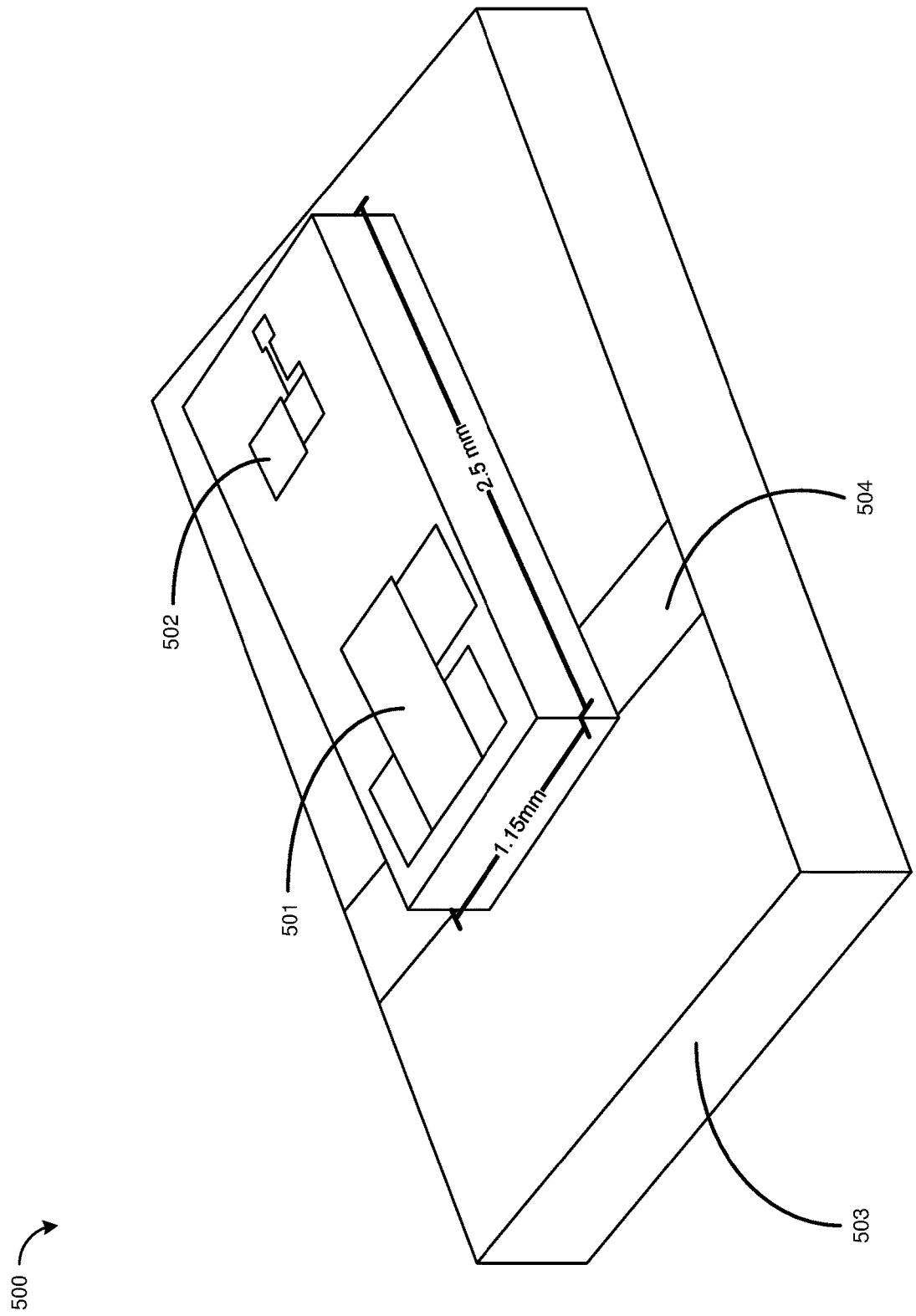
FIG. 5 illustrates an exemplary operation of a TLS thermometer to determine the temperature of a target device.

FIG. 5 illustrates system 500 that details the operation of a TLS thermometer (e.g., TLS thermometer 100) positioned on a target device. System 500 comprises TLS thermometer 501, TLS thermometer 502, target device 503, and transceiver circuitry 504. TLS thermometer 501 comprises an example of TLS thermometer 100, however TLS thermometer 100 may differ. TLS thermometer 502 comprises an example of TLS thermometer 200, however TLS thermometer 200 may differ. Target device 503 comprises a microwave device that operates under cryogenic conditions. For example, target device 503 may comprise a Kinetic Inductance Traveling-Wave Parametric Amplifier (KIT) or some other type of cryogenic microwave device. Transceiver circuitry 504 supplies a microwave signal to target device 503. For example, transceiver circuitry 504 may comprise a coaxial cable configured to feed microwaves to a KIT chip.

Typically, TLS thermometer 501 is placed directly over target device 503. The coupler pad of TLS thermometer 501 couples TLS thermometer 501 to the fringing field of the microwave feedline of target device 503. When target device 503 does not comprise a fringing magnetic field, TLS thermometer 502 is used. The coupler pad of TLS thermometer 503 is wire-bonded to the feedline of transceiver circuitry 504 at the end-launch of the chip. This applies when the feedline of target device 503 is a coplanar waveguide or a narrow microstrip which does not have extended fringing field for sufficient direct capacitive coupling. In this example, target device 503 comprises a sufficiently strong fringing field and so TLS thermometer 501 is used while TLS thermometer 502 is inactive. In some examples, TLS thermometers 501 and 502 do not physically contact target device 503 and are instead positioned proximate to target device 503 but are thermally linked to the target device by other methods such as gold wire bonds.

In operation, TLS thermometer 501 is secured to the surface of target device 503 and couples capacitively to the microstrip section of the target device 503. System 500 is mounted in a dilution refrigerator and cooled down to around 30 milli-Kelvin (mK). Transceiver circuitry 504 sends a probe tone through target device 503. The probe tone comprises a microwave signal with a sweeping frequency in a range around the resonance frequency of TLS thermometer 501. TLS thermometer 501 interacts with the probe tone and modulate the phase and amplitude of the probe tone which carries the information of the resonance frequency of TLS thermometer 501. The processing circuitry measures the probe tone transmitted through the target chip/TLS thermometer, calculates the transmission coefficient of the system, and fit the transmission data to precisely determine the resonance frequency of TLS thermometer 501. The processing circuitry may comprise a Vector Network Analyzer (VNA) or some other type of suitable computing device. The processing circuitry applies the measured frequency to a calibration curve that correlates the measured frequency to a temperature. The processing circuitry determines the temperature of target device 503 based on the calibration curve.

Figure 6:
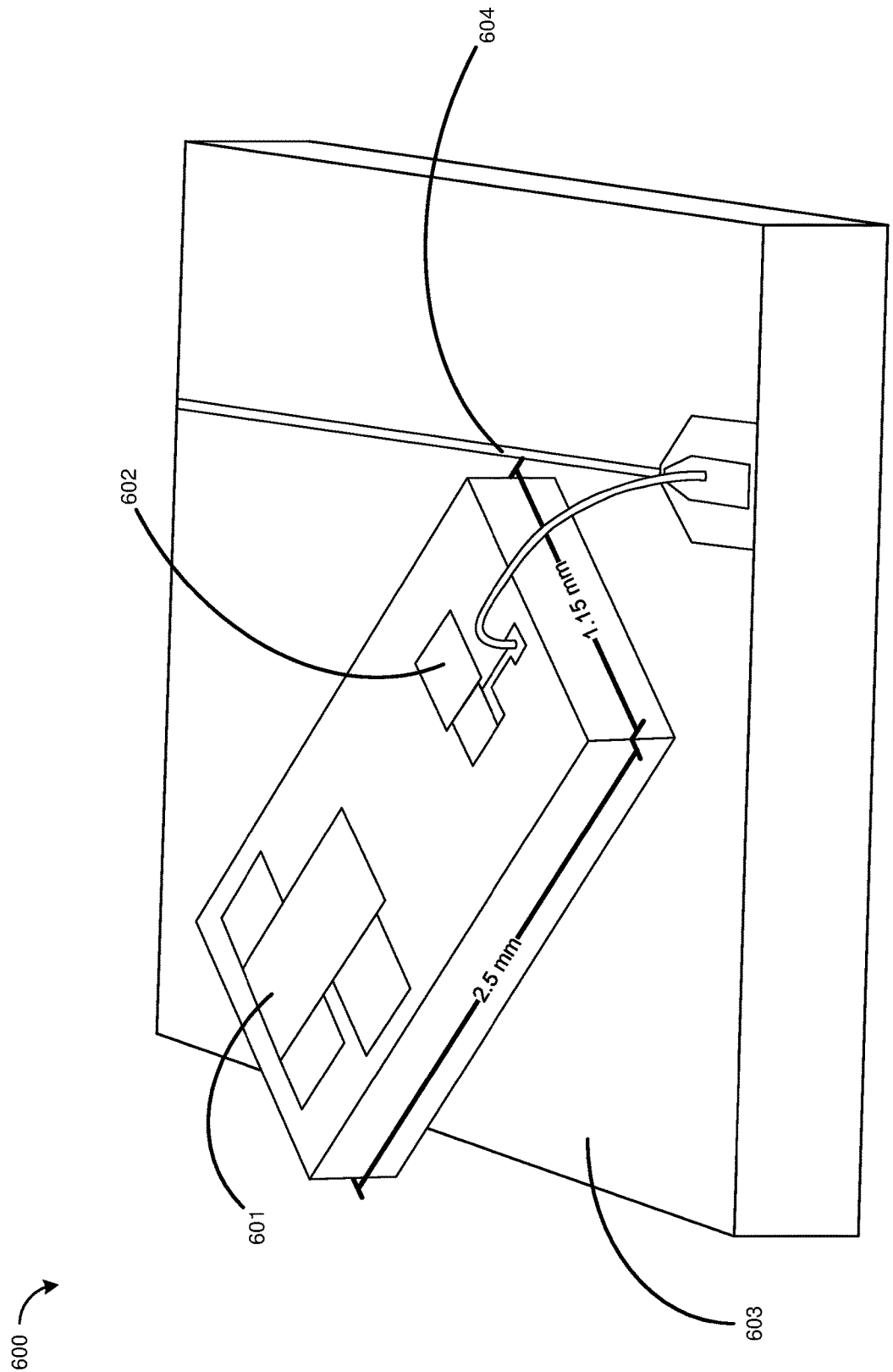
FIG. 6 illustrates an exemplary operation of a TLS thermometer to determine the temperature of a target device.

FIG. 6 illustrates system 600 that details the operation of a TLS thermometer (e.g., TLS thermometer 200) positioned on a target device. System 600 comprises TLS thermometer 601, TLS thermometer 602, target device 603, and transceiver circuitry 604. TLS thermometer 601 comprises an example of TLS thermometer 100, however TLS thermometer 100 may differ. TLS thermometer 602 comprises an example of TLS thermometer 200, however TLS thermometer 200 may differ. Target device 603 comprises a microwave device that operates under cryogenic conditions. For example, target device 603 may comprise KIT chip or some other type of cryogenic microwave device. Transceiver circuitry 604 supplies a microwave signal to target device 603. For example, transceiver circuitry 604 may comprise a coaxial cable configured to feed microwaves to a KIT chip.

Typically, TLS thermometer 601 is placed directly on target device 603. The coupler pad of TLS thermometer 601 capacitively couples to the fringing field of the microwave feedline of target device 603. When target device 603 does not comprise a fringing magnetic field, TLS thermometer 602 is used. The coupler pad of TLS thermometer 602 is wire-bonded to the feedline of transceiver circuitry 604 at the end-launch of target device 603. This applies when the feedline of target device 603 is a coplanar waveguide or a narrow microstrip which does not have extended fringing field for sufficient direct capacitive coupling. In this example, target device 603 does not have a sufficiently strong fringing field and so TLS thermometer 602 is used while TLS thermometer 601 is inactive.

In operation, TLS thermometer 602 is secured to the surface of target device 603. The wire pad of TLS thermometer 602 couples to the feedline of transceiver circuitry 604 by a wire-bond. System 600 is positioned in a cryogenic chamber and cooled down to around 30° mK. Transceiver circuitry 604 sends a microwave signal probe tone through target device 603. TLS thermometer 602 interacts with the probe tone and modulate the phase and amplitude of the probe tone which carries the information of the resonance frequency of TLS thermometer 602. Processing circuitry like a VNA (not shown for clarity) sweeps the probe tone and determines the resonance frequency of TLS thermometer 602. The processing circuitry may comprise a VNA or some other type of suitable computing device. The processing circuitry applies the measured frequency to a calibration curve that correlates the measured frequency to a temperature. The processing circuitry determines the temperature of target device 603 based on the calibration curve.

Figure 7:
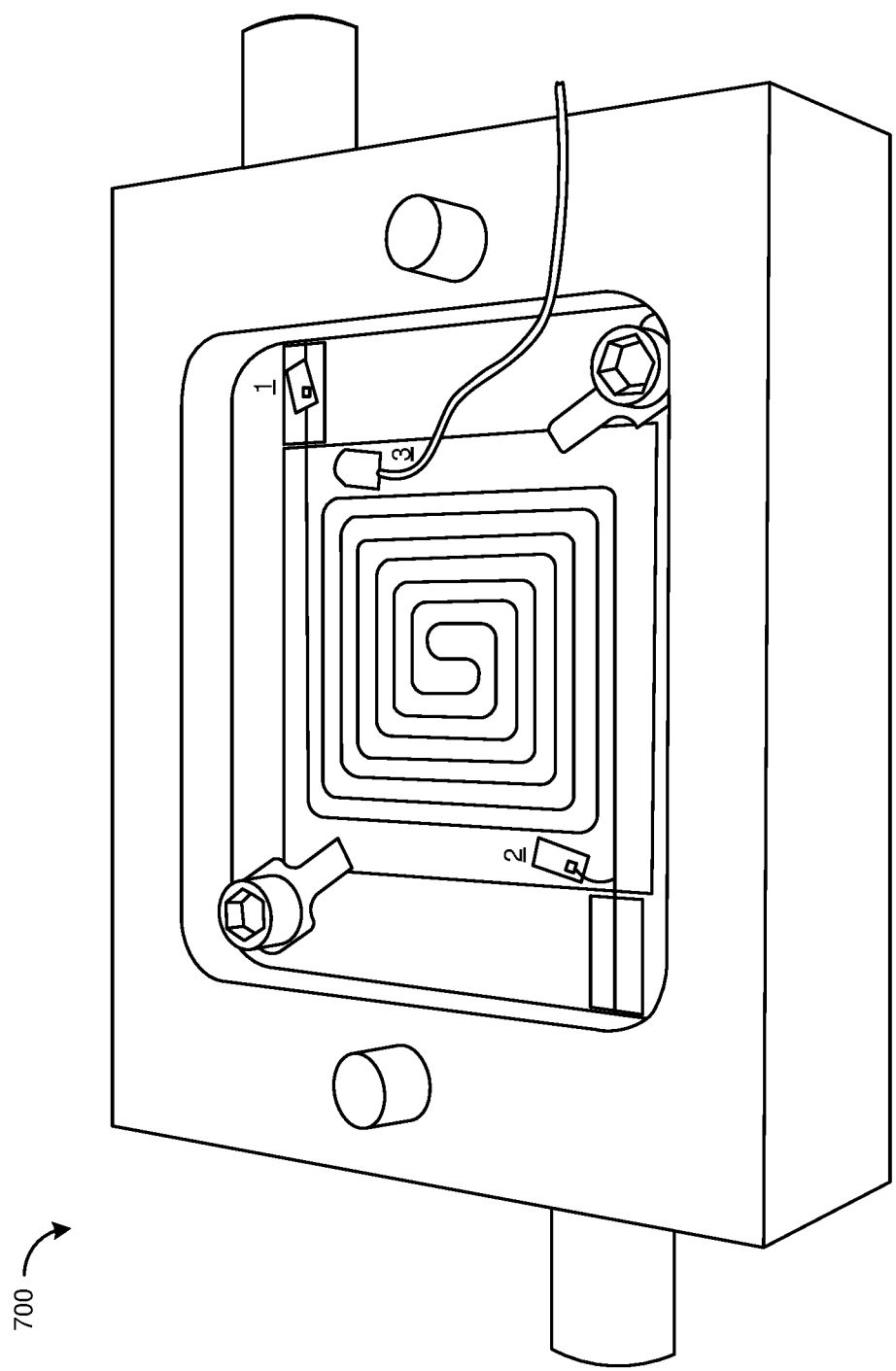
FIG. 7 illustrates an exemplary experimental setup of a TLS thermometer to determine the temperature of a target device.

FIG. 7 illustrates apparatus 700 that comprises an experimental setup of a TLS-thermometer to perform an on-chip temperature measurement. The cryogenic microwave chip comprises a 2 cm by 2 cm KIT chip. The KIT chip comprises a 30-cm long double-spiral nonlinear transmission line made of a Niobium-Titanium-Nitride (NbTiN) material. At location "1", a capacitively coupled TLS thermometer (e.g., TLS thermometer 100) is attached on top of the target device and is coupled capacitively to the microstrip section of the PCB. At location "2", a wire-bonded TLS thermometer (e.g., TLS thermometer 100) was glued onto the KIT chip and a single wire-bonded was made from the center strip of the coplanar waveguide end-launch on the KIT chip to the thermometer coupler pad. At location "3", a conventional RuOx thermometer on the KIT chip at location which is read out by four DC wires for comparison purposes.

Figure 8:
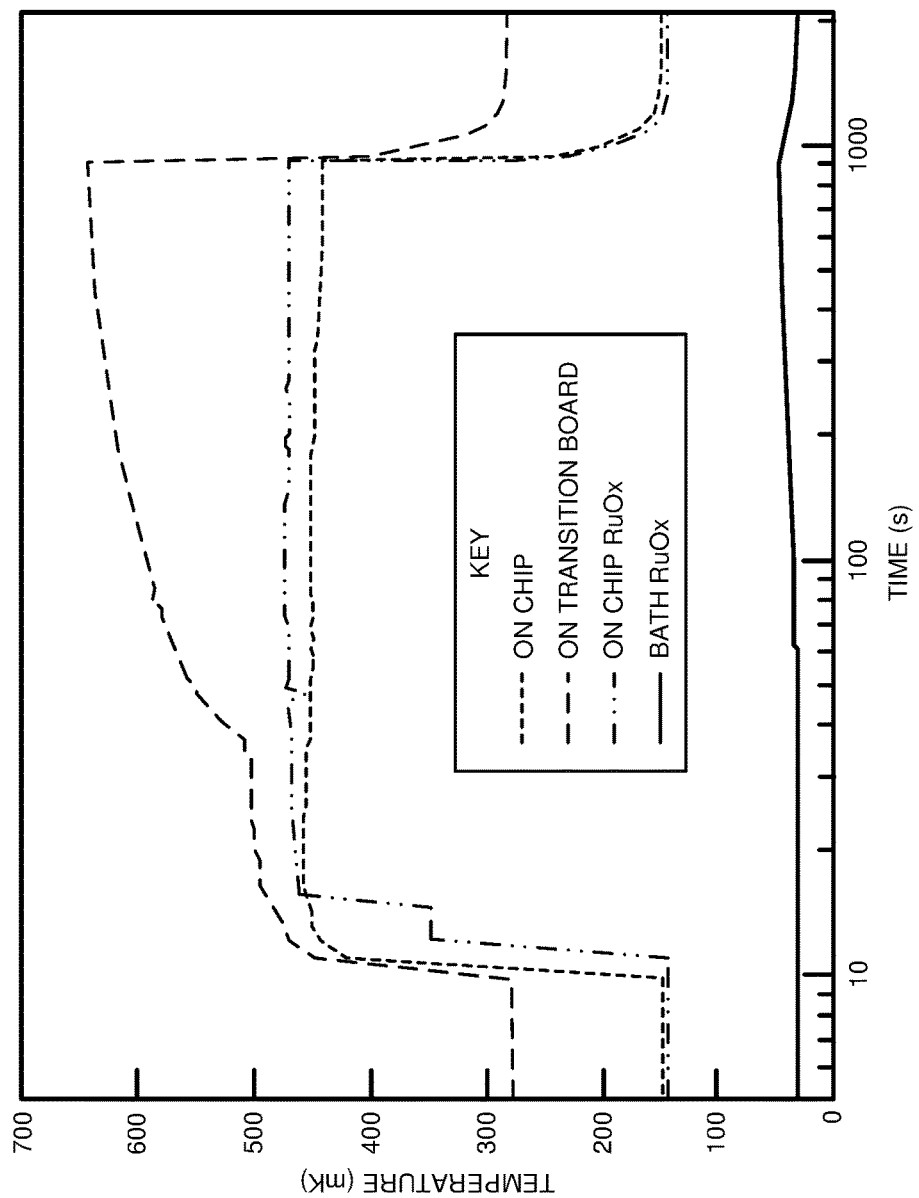
FIG. 8 illustrates a chart that depicts temperature measurements of a target device.

FIG. 8 illustrates chart 800 which comprises temperature readings generated by the experimental setup illustrated by FIG. 7. The device package was mounted in a dilution refrigerator and cooled down to 30° mK. A pump tone of ~100 µW was sent to the KIT chip and turned on for 1000 seconds. The resonance frequencies fr of the two TLS-thermometers were measured using a VNA at a frame rate of 2 sweeps per second and converted to temperature readings with the help of the pre-determined calibration curve fr(T). The temperature readings of the TLS-thermometers, as well as the on-chip Ruthenium Oxide (Ruox) and the stage thermometer, are jointly plotted in chart 800. Prior to turning on the pump, the TLS-thermometer positioned next to the target device on a Printed Circuit Board (PCB) reports 270° mK and the on-chip TLS thermometer reports 150° mK, both significantly higher than the 30° mK bath temperature reported by the stage thermometer. This suggests that the transition board and the KIT chip are both "hotter" than the environment, likely due to excess loading and/or poor thermalization. When the pump is turned on, the PCB heats up to over 600° mK and the chip heats up to 450° mK, while the stage heats only slightly to 50° mK. Moreover, the reading of the on-chip TLS thermometer always tracks the on-chip RuOx very well before and after the pump is turned on. The on-chip TLS thermometers accurately measure the temperature of the KIT chip. The experimental setup demonstrates that the TLS-thermometer provides a novel and powerful tool with unique on-chip temperature measurement capability for cryogenic applications.

Figure 9:
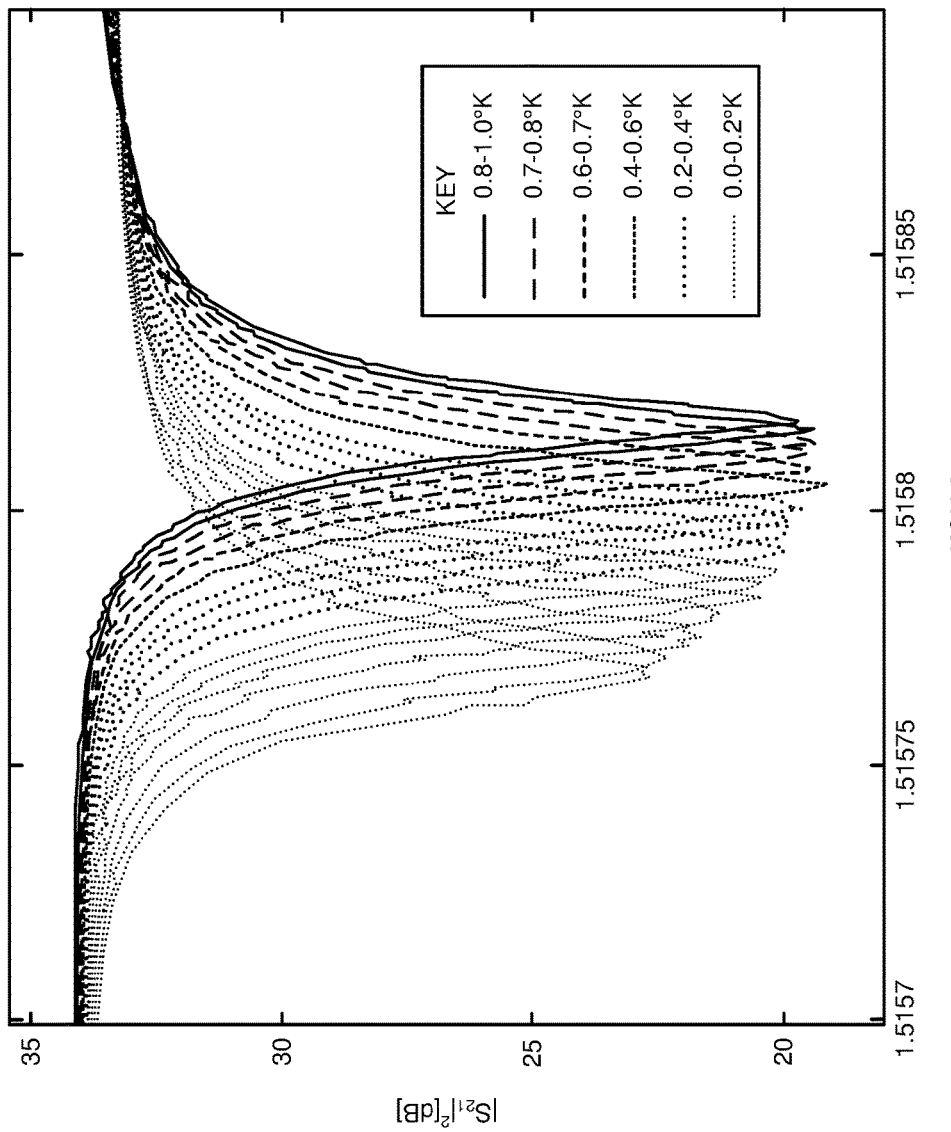
FIG. 9 illustrates a chart that depicts the relationship between resonance frequency and temperature.

FIG. 9 illustrates chart 900 that shows the relationship between resonance frequency (GHz), signal transmission coefficient (dB), and temperature (° K). Chart 900 plots the temperature dependent frequency shift fr(T) measured from a TLS-thermometer device between 50° mK to 1° K. Chart 900 illustrates the transmission drop and frequency shift at the resonance frequency caused by the interaction with a probe signal by a TLS-thermometer. The curve aligns with the theoretical model dictated by equation (1) perfectly with only two free fitting parameters, Fδ and $f_0$. The validity of equation (1) has been extensively verified and all experimental data have shown excellent agreement to the theoretical model.

Figure 10:
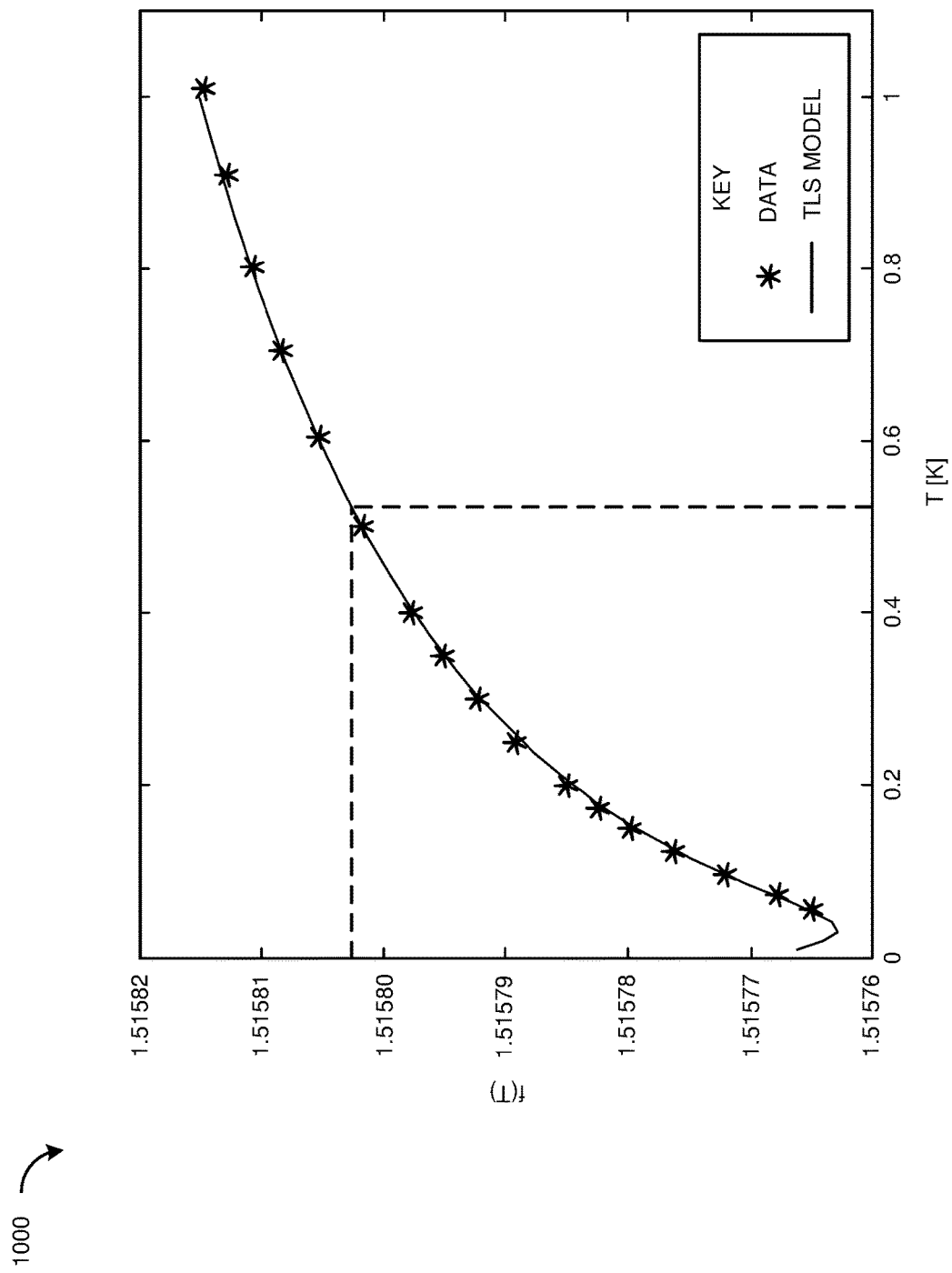
FIG. 10 illustrates a chart that depicts a calibration curve to correlate resonance frequency and temperature.

FIG. 10 illustrates chart 1000 that shows a calibration curve for a TLS thermometer. Chart 1000 illustrates the relationship between the measured resonance frequency and temperature. The curve dictated by fr(T) serves as the standard calibration curve of a TLS-thermometer. Once fr(T) is determined, a measurement of fr will accurately yield the temperature T by a look-up on this curve, as illustrated by the dashed lines on chart 1000. For example, a VNA, or some other type of processing circuitry, may measure the resonance frequency of an on-chip TLS thermometer, correlate the measured resonance frequency with a temperature using the calibration curve illustrated by chart 1000, and responsively identify the temperature of a target device.

Figure 11:
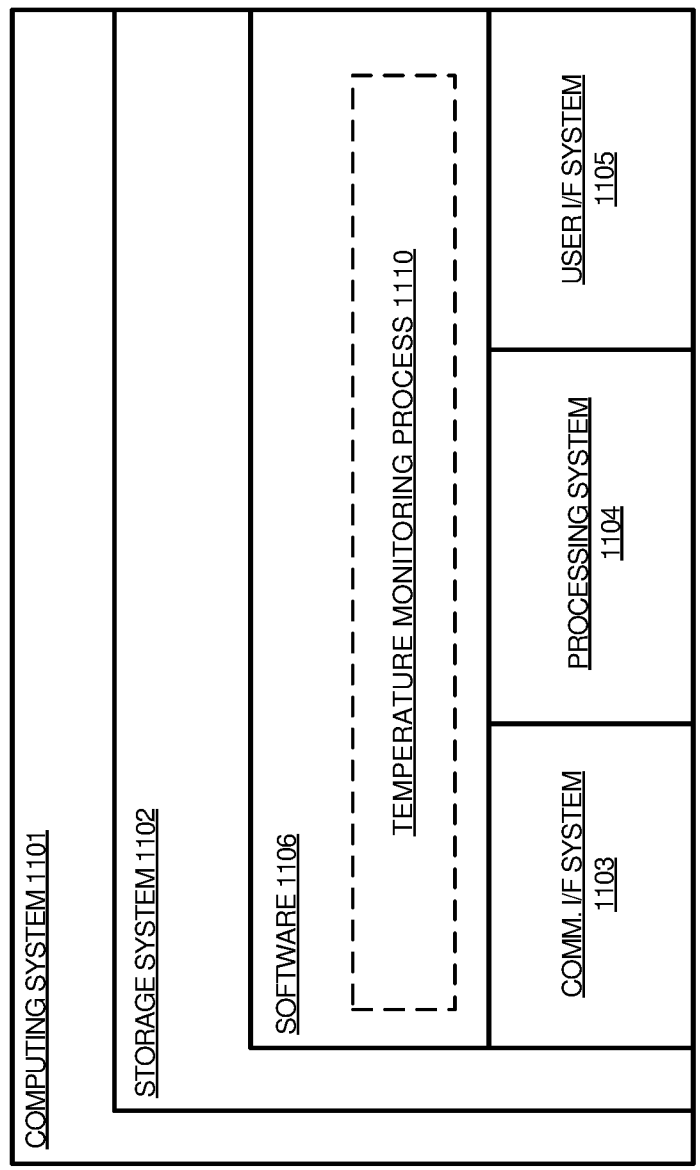
FIG. 11 illustrates an exemplary computing system configured to support the operation of a TLS thermometer.

FIG. 11 illustrates computing system 1101 that is representative of any system or collection of systems in which the various processes, programs, services, and scenarios disclosed herein may be implemented. For example, the computing system may be representative of a VNA that implements a calibration curve to correlate the measured resonance frequency of a TLS thermometer to a temperature. Examples of computing system 1101 include computers, servers, controllers, and the like. Computing system 1101 may be implemented as a single apparatus or may be implemented in a distributed manner. Computing system 1101 comprises storage system 1102, communication interface system 1103, processing system 1104, interface system 1105, and software 1106. Processing system 1104 is operatively coupled with storage system 1102, communication interface system 1103, and user interface 1105.

Processing system 1104 loads and executes software 1106 from storage system 1102. Software implements temperature monitoring process 1110 that is representative of the temperature monitoring processes described in the preceding Figures. When executed by processing system 1104, software 1102 directs processing system 1104 to operate as described herein for at least the various processes, operational scenarios, and sequences discussed in the foregoing implementations. Computing system 1101 may optionally include additional features that are omitted for brevity.

Processing system 1104 comprises a micro-processor and/or other circuitry that retrieves and executes the software from the storage system. Processing system 1104 may be implemented within a single processing device but may also be distributed across multiple processing devices or sub-systems that cooperate in executing program instructions. Examples of processing system 1104 include general purpose CPUs, GPUs, ASICs, FPGAs, logic devices, and the like.

Storage system 1102 comprises computer readable storage media that is readable by processing system 1104 and capable of storing software 1106. Storage system 1102 includes storage media implemented in any method or technology for storage of information like computer readable instructions, data structures, program modules, or other data. Examples of storage media include RAM, read only memory, magnetic disks, optical disks, optical media, flash memory, virtual memory and non-virtual memory, and the like. Storage system 1102 may also include computer readable communication media over which at least some of the software may be communicated internally or externally. Storage system 1102 may be implemented as a single storage device or implemented across multiple co-located or distributed storage devices. Storage system 1102 may comprise additional elements like a controller for communicating with processing system 1104.

Temperature monitoring process 1110 may be implemented in program instructions that, when executed by processing system 1104, direct processing system 1104 to operate as described with respect to the preceding Figures. For example, software 1106 may comprise program instructions for implementing temperature monitoring process 1110 as described herein. The program instructions include various components or modules that interact to carry out the various processes. The components and/or modules may be embodied in compiled instructions, interpreted instructions, or in some other type of instructions. The components and/or modules may be executed in a synchronous or asynchronous manner, serially or in parallel, in a single threaded environment or multi-threaded, or in accordance with some other execution paradigm. Software 1106 may include additional processes, programs, or components, such as operating systems, virtualization software, or other application software. Software 1106 may also comprise firmware or some other form of machine-readable processing instructions executable by processing system 1104.

Software 1106, when loaded into processing system 1104 and executed, transforms a suitable apparatus, system, or device (of which the computing system is representative) from a general-purpose computing system into a special-purpose computing system customized to correlate the measured resonance frequency of a TLS thermometer with a temperature as described herein. Encoding software 1106 onto storage system 1102 transforms the physical structure of storage system 1102. The specific transformation of the physical structure depends on various factors like the technology used to implement the storage media of storage system 1102 and whether the computer-storage media are characterized as primary or secondary storage. For example, if the computer readable storage media are implemented as semiconductor-based memory, software 1106 transforms the physical state of the semiconductor memory when the program instructions are encoded thereby transforming the state of transistors, capacitors, or other discrete circuit elements constituting the semiconductor memory.

Communication interface system 1103 may include communication connections and devices that allow for communication with other computing systems over communication networks. Examples of the connections and devices that together allow for inter-system communication may include network interface cards, antennas, power amplifiers, RF circuitry, transceivers, and the like. The connections and devices may communicate over communication media like metal, glass, air, or another type of communication media. Communication between computing system 1101 and other computing systems (not shown), may occur over a communication network or networks and in accordance with communication protocols. Examples include intranets, internets, local area networks, wide area networks, wireless networks, and the like.

In conclusion, a TLS thermometer configured for temperature measurement in cryogenic systems has been demonstrated. The TLS thermometer comprises a superconducting micro-resonator with amorphous dielectric materials that contains Two-Level Systems (TLS) deposited or naturally formed on the surfaces. The temperature is read out by measuring the resonance frequency of the resonator, which depends on temperature. The dependence follows a well-understood analytical curve. The TLS thermometer can be frequency multiplexed into existing microwave devices and readout systems without additional dedicated wiring. The TLS thermometer may perform of on-chip temperature measurement of cryogenic microwave devices without adding extra wires or readout infrastructure. The TLS thermometer is smaller and much faster than the conventional resistance-based thermometers. The TLS thermometer may be multiplexed into an array and are well suited for superconducting qubit applications.

TLS-thermometers are best suited to be attached to and measure the temperature of an existing cryogenic microwave device. However, the use of a TLS thermometer may be inhibited when the target device does not have microwave channels. The resonator of the TLS thermometer is operated in the regime where other temperature dependent sources of frequency shift are minimal. One important source, thermally activated quasiparticles, dominate the response at temperatures above ~Tc/8. For niobium, the material used in some TLS thermometers resonates with Tc≈9° K which may inhibit their use in temperature ranges that exceed 1° K. As drifts in the pinned magnetic field cause a slight global offset in fr, the TLS thermometer may need to be re-centered each time it is cooled through Tc. However, as the shape of the curve is identical, just offset, the calibrated curve can be re-fixed by measuring fr at 1 point at a known high temperature (~0.7-1° K). TLS thermometers may also be sensitive to changing magnetic fields.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The components of an exemplary TLS thermometers may be integrated into one or more cryogenic microwave chips or integrated circuits. For example, a single integrated circuit could include the TLS thermometer and qubit resonators. In other implementations, the TLS thermometer may be attached to the surface of a cryogenic microwave chip.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of measuring a temperature of a target device that resides in a cryogenic environment and that comprises resonators that indicate qubit states, the method comprising:
   sending a probe signal through the target device and a lumped-element resonator device, wherein the lumped-element resonator device is proximate to a surface of the target device and the lumped-element resonator device is configured to interact with the probe signal;
   reading the probe signal transmitted through the target device and the lumped-element resonator device and responsively measuring a resonance frequency of the lumped-element resonator device; and
   determining the temperature of the target device by correlating the resonance frequency of the lumped-element resonator device with the temperature of the target device.

2. The method of claim 1, wherein the lumped-element resonator device is physically coupled to the surface of the target device.

3. The method of claim 1, wherein the lumped-element resonator device is proximate to the target device without physically contacting the target device.

4. The method of claim 1, wherein determining the temperature of the target device by correlating the resonance frequency of the lumped-element resonator device with the temperature of the target device comprises applying a calibration curve to the resonance frequency of the lumped-element resonator device and responsively determining the temperature of the target device based on the calibration curve.

5. The method of claim 1, wherein reading the probe signal transmitted through the target device and the lumped-element resonator device and responsively measuring the resonance frequency of the lumped-element resonator device comprises sweeping the probe signal in a frequency band, measuring the probe signal transmitted through the target device and the lumped-element resonator device, calculating a transmission coefficient for the measured probe signal, and fitting the transmission coefficient to a resonator circuit model to determine the resonance frequency of the lumped-element resonator device.

6. The method of claim 1, wherein the lumped-element resonator device comprises a meandering inductor, a coupling capacitor, and an interdigitated capacitor; and the meandering inductor, the coupling capacitor, and the interdigitated capacitor are configured to interact with the probe signal.

7. The method of claim 6, wherein the meandering inductor, the coupling capacitor, and the interdigitated capacitor comprise:
   a Silicon substrate, a superconducting Niobium film that is deposited on the Silicon substrate, and an amorphous dielectric that is attached to the Silicon substrate and the superconducting Niobium film; and wherein:
   the amorphous dielectric comprises at least one of:
      a naturally formed oxide layer on the Silicon substrate and the superconducting Niobium film; or
      a deposited silicon oxide and/or silicon nitride layer on the Silicon substrate and the superconducting Niobium film.

8. The method of claim 6, further comprising:
   interacting with the probe signal; and
   responsively modulating a phase and an amplitude of the probe signal to carry information that indicates the resonance frequency of the lumped-element resonator device.

9. An apparatus configured to measure a temperature of a target device that resides in a cryogenic environment and that comprises resonators that indicate qubit states, the apparatus comprising:
   transceiver circuitry configured to
      send a probe signal through the target device;
   a lumped-element resonator device configured to:
      interact with the probe signal; and
      modulate a phase and an amplitude of the probe signal, wherein the lumped-element resonator device is proximate to a surface of the target device; and
   processing circuitry configured to:
      read the probe signal transmitted through the target device;
      responsively measure a resonance frequency of the lumped-element resonator device; and
      determine the temperature of the target device by correlating the resonance frequency of the lumped-element resonator device with the temperature of the target device.

10. The apparatus of claim 9, wherein the lumped-element resonator device is physically coupled to the surface of the target device.

11. The apparatus of claim 9, wherein the lumped-element resonator device is proximate to the target device without physically contacting the target device.

12. The apparatus of claim 9, wherein the processing circuitry is configured to:
   apply a calibration curve to the resonance frequency of the lumped-element resonator device; and
   responsively determine the temperature of the target device based on the calibration curve.

13. The apparatus of claim 9, wherein the processing circuitry is configured to:
   sweep the probe signal in a frequency band;
   measure the probe signal transmitted through the target device and the lumped-element resonator device;
   calculate a transmission coefficient for the measured probe signal; and
   fit the transmission coefficient to a resonator circuit model to determine the resonance frequency of the lumped-element resonator device.

14. The apparatus of claim 9, wherein the lumped-element resonator device comprises a meandering inductor, a coupling capacitor, and an interdigitated capacitor.

15. The apparatus of claim 14, wherein the meandering inductor, the coupling capacitor, and the interdigitated capacitor comprise:
a Silicon substrate, a superconducting Niobium film that is deposited on the Silicon substrate, and an amorphous dielectric that is attached to the Silicon substrate and the superconducting Niobium film; and wherein:
the amorphous dielectric comprises at least one of:
a naturally formed oxide layer on the Silicon substrate and the superconducting Niobium film; or
a deposited silicon oxide and/or silicon nitride layer on the Silicon substrate and the superconducting Niobium film.

16. The apparatus of claim 14, wherein the meandering inductor, the coupling capacitor, and the interdigitated capacitor are configured to:
interact with the probe signal; and
responsively modulate the phase and the amplitude of the probe signal to carry information that indicates the resonance frequency of the lumped-element resonator device.

17. An apparatus configured to measure a temperature of a qubit resonator device that resides in a cryogenic environment, the apparatus comprising:
transceiver circuitry configured to
send a probe signal through the qubit resonator device;
the qubit resonator device being configured to:
interact with the probe signal; and
modulate a phase and an amplitude of the transmitted probe signal,
wherein the qubit resonator device comprises one or more qubit resonators and a temperature resonator that resonates at a different frequency than the one or more qubit resonators; and
processing circuitry configured to:
read the probe signal through the qubit resonator device;
measure a resonance frequency of the temperature resonator; and
responsively determine the temperature of the qubit resonator device by correlating the resonance frequency of the temperature resonator with the temperature of the qubit resonator device.

18. The apparatus of claim 17, wherein the temperature resonator comprises a lumped-element resonator configured to modulate the phase and amplitude of the probe signal to carry information that indicates the resonance frequency of the temperature resonator.

19. The apparatus of claim 17, wherein the processing circuitry is configured to:
sweep the probe signal in a frequency band;
measure the probe signal transmitted through the qubit resonator device;
calculate a transmission coefficient for the measured probe signal; and
fit the transmission coefficient to a resonator circuit model to determine the resonance frequency of the temperature resonator.

20. The apparatus of claim 17, wherein the processing circuitry is configured to:
apply a calibration curve to the resonance frequency of the temperature resonator; and
responsively determine the temperature of the qubit resonator device based on the calibration curve.

* * * * *